United States Patent [19]

Schnellmann et al.

[11] 4,190,544
[45] Feb. 26, 1980

[54] FILTER ELEMENT FOR A ROTATABLE DISC FILTER

[75] Inventors: Ferdinand Schnellmann, Jona; Hanspeter Meier, Rapperswil, both of Switzerland

[73] Assignee: Chemap A.G., Männedorf, Switzerland

[21] Appl. No.: 964,939

[22] Filed: Nov. 30, 1978

Related U.S. Application Data

[63] Continuation of Ser. No. 874,906, Feb. 3, 1978, abandoned.

[30] Foreign Application Priority Data

Feb. 23, 1977 [CH] Switzerland ................. 2247/77

[51] Int. Cl.$^2$ ............................................. B01D 33/28
[52] U.S. Cl. ................................... 210/461; 210/486
[58] Field of Search ............... 210/486, 461, 346, 347, 210/331

[56] References Cited

U.S. PATENT DOCUMENTS 3,491,886  1/1970  Glos et al. .................. 210/486

FOREIGN PATENT DOCUMENTS 458286  9/1966  Switzerland .

OTHER PUBLICATIONS

Perry's Chemical Engineer's Hand Book, 4th Edition; pp. 23-26 & 23-57.

Primary Examiner—Frank Sever
Attorney, Agent, or Firm—Michael J. Striker

[57] ABSTRACT

A filter element is provided for use with a pressure disc filter. The inventive filter element includes a metal plate having a concave surface. A washer is provided for mounting the metal plate within a pressure disc filter while orienting the concave surface so that it faces upwardly within the pressure disc filter. A clamping ring is provided for holding a filter material above the concave surface. The inventive concept also includes a synthetic resin shield composed of one or more parts and fastened to the concave surface of the metal plate so as to protect this surface of the metal plate against contact with corrosive substances.

8 Claims, 3 Drawing Figures

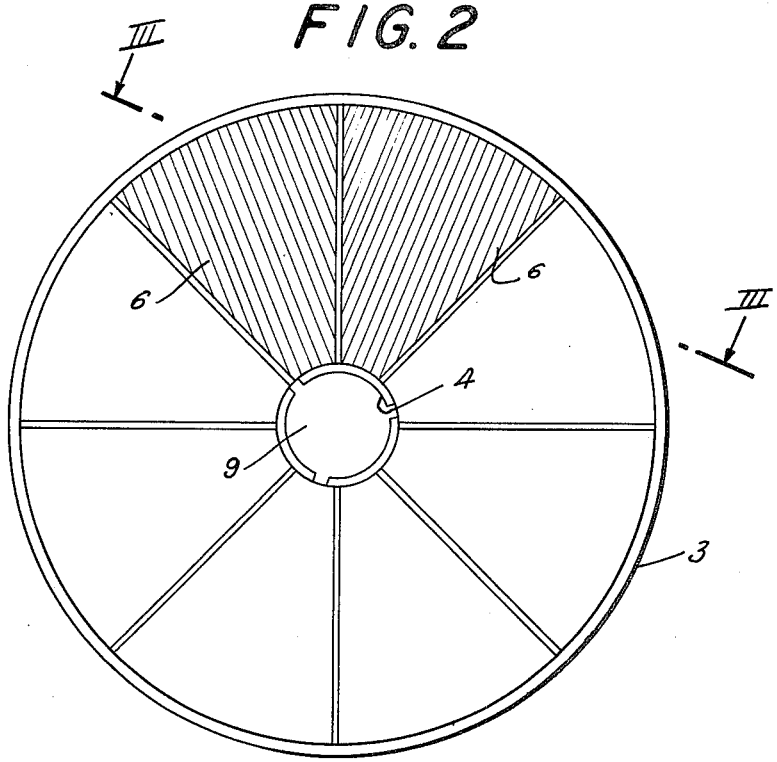
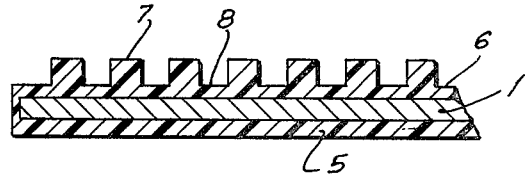
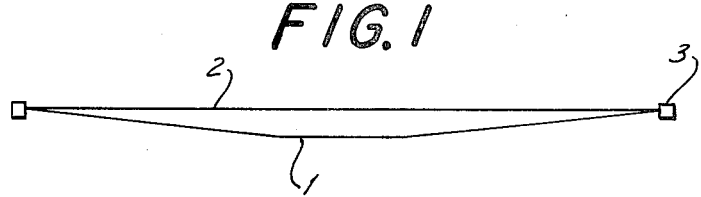

FILTER ELEMENT FOR A ROTATABLE DISC FILTER

CROSS-REFERENCE TO RELATED APPLICATIONS

This application is a continuation of application Ser. No. 874,906 filed Feb. 3, 1978 (now abandoned) by the same inventors and with the same title as the present application.

BACKGROUND OF THE INVENTION

This invention relates to a filter element for a rotatable disc filter, and more particularly a filter element which is especially suitable for use with a centrifugal filter.

Conventional filter elements in rotatable disc filters are superposed over each other on a hollow shaft. The shaft and its filter elements are then installed inside a filtering tank or housing.

It has been proposed to provide a filter element for a rotatable disc filter which consists of a conically buckled plate. A filter cloth is stretched over the plate so that the filtrate can flow within the space between the filter cloth and the buckled plate and then can drain off by way of the hollow shaft with which this space communicates.

A screen for supporting the filter cloth is commonly found on one side of such filter elements. One of the advantages of the above-mentioned proposed filter elements is that the buckled design of the filter plate makes a supporting screen unnecessary. However, since the plate is of metal this filter element has the disadvantage that it can be corroded by metalcorrosive substances in the material being filtered.

A synthetic resin filter element is disclosed by Swiss Pat. No. 458,286. This filter element is produced from a pressed glass fiber-reinforced synthetic resin plate. However, the synthetic resin element is unstable in the presence of strong mineral acids. This element has adequate mechanical stability despite being made of synthetic material, because it is provided with profiling which defines ring channels but this remedy sharply retards the rate of filtrate discharge. An additional disadvantage characteristic of synthetic resin filter elements is the expense of providing and installing a filtering ring at the center of the synthetic resin plate.

SUMMARY OF THE INVENTION

An object of this invention is to provide a filter element which has sufficient mechanical stability and an improved resistance to corrosion.

This object is achieved by providing a metal plate of the filter element with a concave upper side to which synthetic resin shields are fastened. The synthetic resin protects the metal plate from corrosive influences.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 shows a vertical section through the inventive filter element;

FIG. 2 shows a top view of the inventive filter plate; and

FIG. 3 is a section taken on line III—III of FIG. 2.

BRIEF DESCRIPTION OF THE PREFERRED EMBODIMENTS

The inventive filter element includes a conical metal plate 1. a filter cloth is fastened between a clamping ring 3 and a washer 4 which is located in the center of the plate 1 and around the hollow shaft 9. Sections of synthetic resin 6 are vulcanized to the concave side of the plate 1 or secured thereto by means of an adhesive which bonds to metal. A coating 5 of the same synthetic resin is provided on the convex underside of the metal plate 1; however, this coating 5 is not profiled and is instead formed as a continuous layer on the metal. The synthetic resin sections 6 include an upper surface from which a plurality of projections 7 extend. Each pair of projections 7 defines a radial channel 8 which extends along the upper surface of the sections 6. The projections 7 serve as supporting profiles for the actual filter cloth 2. Each channel 8 serves as a pathway for the discharge of the filtrate towards the hollow shaft 9 which has apertures (FIG. 2) communicating with the space between the filter cloth 2 and the plate 1.

A supporting screen for the filter cloth is unnecessary when the inventive synthetic resin profile is used.

An important advantage of the inventive filter plate is its high resistance to chemical corrosion. Another important advantage is the improved discharge of the filtrate.

The inventive concept basically involves protection of the metal of the plate from corrosive substances. The metal plate is disc-shaped or circular. As mentioned before, the concave upper surface could be covered with a plurality of physically discrete sections 6 of synthetic resin in order to achieve this protection. Alternatively, the concave upper surface may be coated with a single synthetic resin coat or shield. Preferably, the synthetic resin shield or sections 6 cover(s) substantially all of the concave upper surface of the metal plate. The coat 5 on the convex underside of the plate may be physically integral with at least a portion of the shield 6 and is preferably physically integral with at least substantially all of the outer peripheral edges of the shield so that the metal plate is thereby substantially enclosed within a casing of synthetic resin.

While the coat 5 on the convex underside need not be profiled, the shield or sections 6 are preferably profiled with a design which supports a filter material while providing drainage channels directing the filtrate towards the hollow shaft 9. This design is preferably obtained by toothing or even serrating the shield or sections 6. As shown in FIG. 3, the shield or sections 6 include(s) a layer covering the metal plate 1. Projections or teeth 7 extend from this layer in a direction away from the metal plate 1. Preferably, the projections 7 extend about 90° away from both the concave surface of the metal plate and the layer of synthetic resin covering this surface. The projections 7 are preferably rectangular and of the same size and height. Each projection 7 preferably has a planar upper surface upon which a portion of the filter cloth material will rest. The projections 7 are preferably substantially evenly spaced to thereby define channels 8 of a substantially constant width.

Any synthetic resin may be used to shield the metal plate although the choice of a particular synthetic resin for the shield 6 may be dictated by the nature of solutions with which the resin is likely to come into contact. "Hard rubber," a broad term including ebonite or vulcanite, is particularly suitably and versatily utilized as the synthetic resin.

It will be understood that each of the elements described above, or two or more together, may also find a useful application in other types of a filter element for a rotatable disc filter differing from the types described above.

While the invention has been illustrated and described as embodied in a construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with a pressure disc filter of the type in which media to be filtered corrodes metal upon contact therewith, a filter element comprising a metallic filter plate having upper and lower surfaces and being subject to corrosion upon contact with the media to be filtered, said filter plate having a center outlet; a coating covering said surfaces except said outlet and being at least resistant to corrosion on contact with the media to be filtered, said coating having an upwardly facing surface having a plurality of rectangular, substantially equally dimensioned and evenly spaced projections each extending upwardly from the upwardly facing surface to thereby provide a plurality of vertical channels all of which extend radially to said outlet and through which filtrate is drained directly into the outlet; and a filter cloth at least partially overlying said coating and being supported on said projections, so that filtrate passes through said filter cloth onto said coating without coming into contact with said metallic filter plate.

2. A combination of claim 1, wherein said coating comprises a plurality of discrete profiled sections.

3. A combination of claim 1, wherein said coating has at least one radially outwardly extending channel.

4. A combination of claim 1, wherein each of said projections has a top facing planar surface extending substantially 90° away from the upwardly facing surface of the coating.

5. A combination as defined in claim 1, wherein said upper surface of the plate has a concave profile.

6. A combination as defined in claim 1, wherein said coating is of synthetic plastic material.

7. A combination of claim 6, and further comprises a metal-adhering adhesive between the concave surface and the coating.

8. A combination as defined in claim 1, wherein said coating substantially encases the metallic filter plate.

* * * * *